United States Patent [19]

Matsubara et al.

[11] Patent Number: 5,436,544
[45] Date of Patent: Jul. 25, 1995

[54] METHOD OF PHASE ADVANCING COMPENSATION CONTROL FOR AN AC SYNCHRONOUS MOTOR

[75] Inventors: Shunsuke Matsubara; Tadashi Okita, both of Oshino, Japan

[73] Assignee: Fanuc Ltd., Minamitsuru, Japan

[21] Appl. No.: 185,890

[22] PCT Filed: May 24, 1993

[86] PCT No.: PCT/JP93/00679

§ 371 Date: Jan. 27, 1994

§ 102(e) Date: Jan. 27, 1994

[87] PCT Pub. No.: WO93/24990

PCT Pub. Date: Dec. 9, 1993

[30] Foreign Application Priority Data

Jun. 1, 1992 [JP] Japan .................. 4-163325

[51] Int. Cl.$^6$ .................................................. H02P 5/00
[52] U.S. Cl. .................................. 318/719; 318/809
[58] Field of Search .................. 318/798–815, 318/719, 729, 757, 758, 767; 312/632, 437, 439

[56] References Cited

U.S. PATENT DOCUMENTS

| | | | |
|---|---|---|---|
| 3,734,633 | 3/1988 | Ono et al. | 318/723 |
| 4,450,393 | 5/1984 | Kohzai et al. | 318/592 |
| 4,599,549 | 7/1986 | Mutoh et al. | 318/811 |
| 4,802,777 | 2/1989 | Yamada | 318/594 |
| 5,013,987 | 5/1991 | Wakui | 318/632 |
| 5,057,759 | 10/1991 | Ueda et al. | 318/803 X |
| 5,140,247 | 8/1992 | Verbos | 318/809 |

*Primary Examiner*—Jonathan Wysocki
*Attorney, Agent, or Firm*—Staas & Halsey

[57] ABSTRACT

An AC synchronous motor control method in which the optimum phase advancing control is executed not only in acceleration but also in deceleration of a motor. When a value P, which is obtained by multiplying a motor's revolutionary speed by a torque command, is positive or equal to "0", a proportional constant of a linear equation for calculating a phase advancing compensation amount $\delta$ is set to k, whereas, when the above value P is negative, the above proportional constant is set to k' (k' < k). Then, the phase advancing compensation amount $\delta$ is calculated by using the proportional constant k or k', and the calculated compensation amount $\delta$ is added to a rotor phase $\theta$, thus advancing the phase of current commands. The motor is controlled by executing current loop processing on the basis of a current command T thus obtained.

3 Claims, 6 Drawing Sheets

METHOD OF PHASE ADVANCING COMPENSATION CONTROL FOR AN AC SYNCHRONOUS MOTOR

BACKGROUND OF THE INVENTION

1. Field of the Invention

The present invention relates to a control method of an AC synchronous motor, in particular, to a phase lead control method.

2. Description of the Related Art

In controlling an AC synchronous motor, as the revolving speed of the motor increases to enter high speed range, the power factor of the motor tends to fall due to the phase delay of the supplied current. In order to prevent the fall of the power factor, a phase advancing compensation control, which controls the phase of a current command by advancing the phase, is generally employed.

Figure 1:
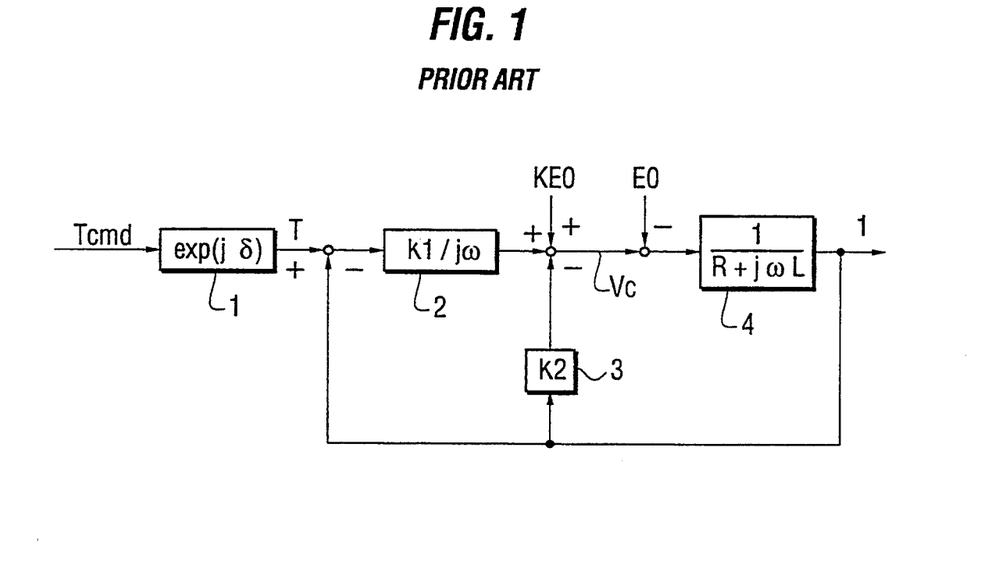
FIG. 1 is a block diagram of a conventional current control for executing a phase advancing correction control of a current command.

FIG. 1 is a block diagram showing a current control system for executing the phase advancing compensation control. In FIG. 1, a phase of a current command (torque command) Tcmd is advanced by $\delta$ using a phase advancing module 1, and the current command T, whose phase is advanced, is treated as a current command for a current loop. According to current loop processing, the difference between the current command T, whose phase is advanced, and an actual current I of a motor is calculated, and the calculated difference is integrated by an integrating module 2, and is further multiplied by an integrating constant k1. A proportional module 3 multiplies the actual current I by a proportional constant k2. An output value of the proportional module 3 is subtracted from an output value of the integrating module 2, and a counter electromotive force correction value kEo is added to the difference. The value thus obtained is treated as a command voltage (terminal voltage) Vc supplied to the motor.

A module 4 is a term representing a motor coil. A voltage actually applied to the motor coil (R and L represent resistance and inductance, respectively) is a voltage obtained by subtracting a counter electromotive force Eo from the aforesaid command voltage (terminal voltage) Vc, and a current I flows.

According to the aforesaid phase advancing module 1, the phase advancing compensation amount $\delta$ is calculated by a linear function proportional to an absolute value of the motor's revolutionary speed v, and is ordinarily obtained by a function expressed by the following equation (1):

$$\delta = K \cdot |v| \tag{1}$$

Where, K is a proportional constant.

Using the phase advancing compensation amount $\delta$ and based on the position of the rotor, i.e., based on the counter electromotive force Eo and the current command Tcmd, the phase-advanced current command T (a vector) can be expressed as follows:

$$T = [T_0 \cdot \cos\delta\ T_0 \cdot \sin\delta]^T \tag{2}$$

Where $T_{cmd} = [T_0\ 0]^T$

The actual current I (vector) is given as follows:

$$I = [x_1 \cdot T_0\ y_1 \cdot T_0]^T \tag{3}$$

In addition, the following equation (4) is obtained on the basis of the relationship between the command voltage applied to the motor coil and the voltage applied to the coil side as is shown in FIG. 1.

$$(k_1/j\omega)(T-I) - k_2 \cdot I + k \cdot E_o = E_o + (R + j\omega L)I \tag{4}$$

If a current vector $[x_1\ y_1]^T$ is calculated by the above equation (4), the following equation (5) is obtained.

$$\begin{bmatrix} X_1 \\ Y_1 \end{bmatrix} = \frac{1}{(R+k_2)^2 + (\omega L - k_1/\omega)^2} \begin{bmatrix} R+k_2 & -(\omega L - k_1/\omega) \\ (\omega L - k_1/\omega) & R+k_2 \end{bmatrix} \times \begin{bmatrix} k_1/\omega \sin\delta - (1-k)E_o/T_o \\ k_1/\omega \cos\delta \end{bmatrix} \tag{5}$$

Figure 3:
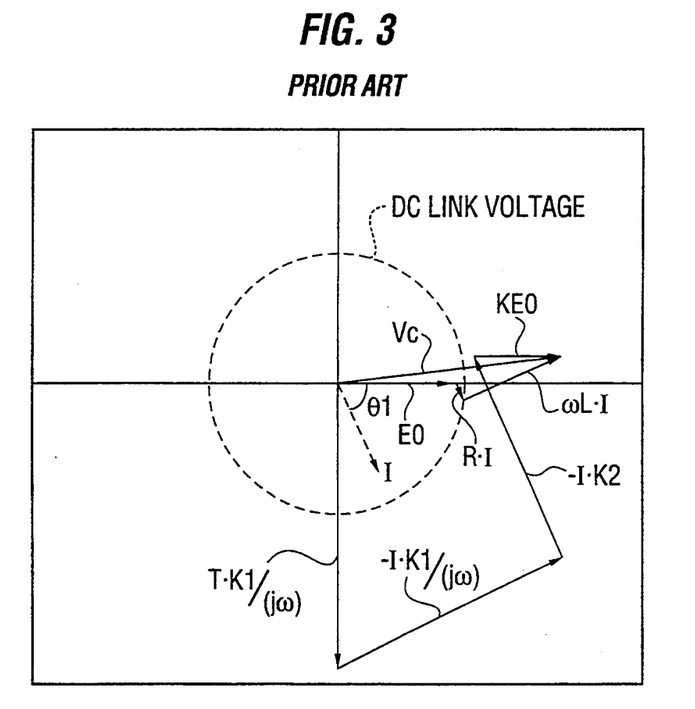
FIG. 3 is a vector diagram in the case where the phase advancing correction of the current command is not made in accelerating.
Figure 4:
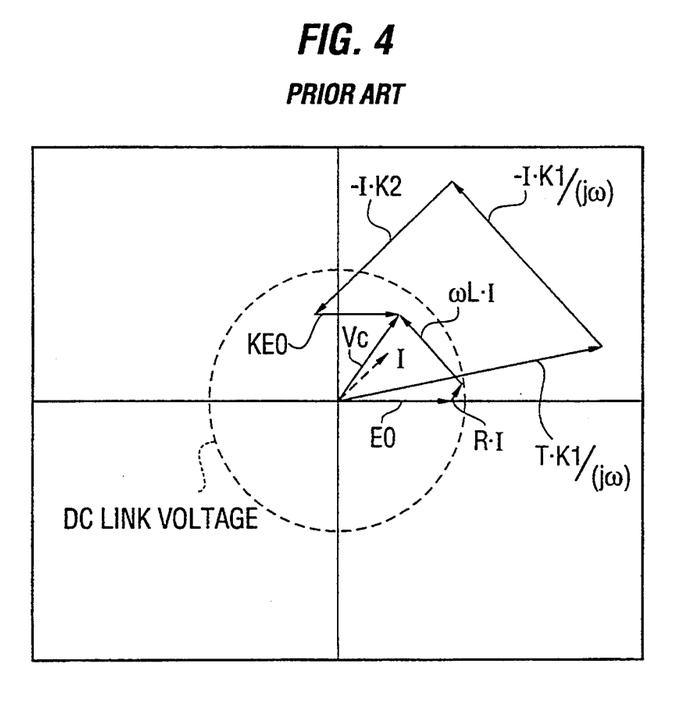
FIG. 4 is a vector diagram in the case where the phase advancing correction of the current command is made in accelerating.

FIGS. 3 through 6 are vector diagrams drawn on the basis of the above equations (4) and (5). FIGS. 3 and 4 show vector diagrams in the case where the motor is accelerated at a velocity of 2000 rpm. FIG. 3 shows a vector diagram in the case where the phase advancing compensation amount $\delta$ is set to "0" (zero). FIG. 4 is a vector diagram in the case where the phase advancing compensation $\delta$ is set to 99.7 degrees. In FIG. 3, the actual current I is delayed by $\theta_1$ with respect to the current command Tcmd (counter electromotive force Eo); on the other hand, the command voltage Vc becomes more than a DC link voltage which is a power-supply voltage of an inverter. Therefore, the power factor becomes poor. In FIG. 4, the command voltage Vc is within the DC link voltage, and power factor becomes better. In other words, the power factor is improved by the phase advancing control.

Figure 5:
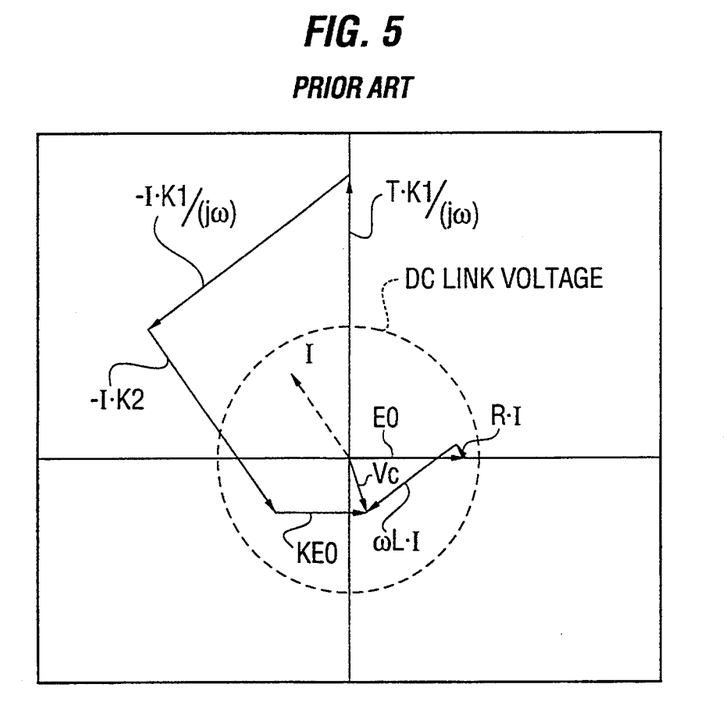
FIG. 5 is a vector diagram in the case where the phase advancing correction of the current command is not made in decelerating.
Figure 6:
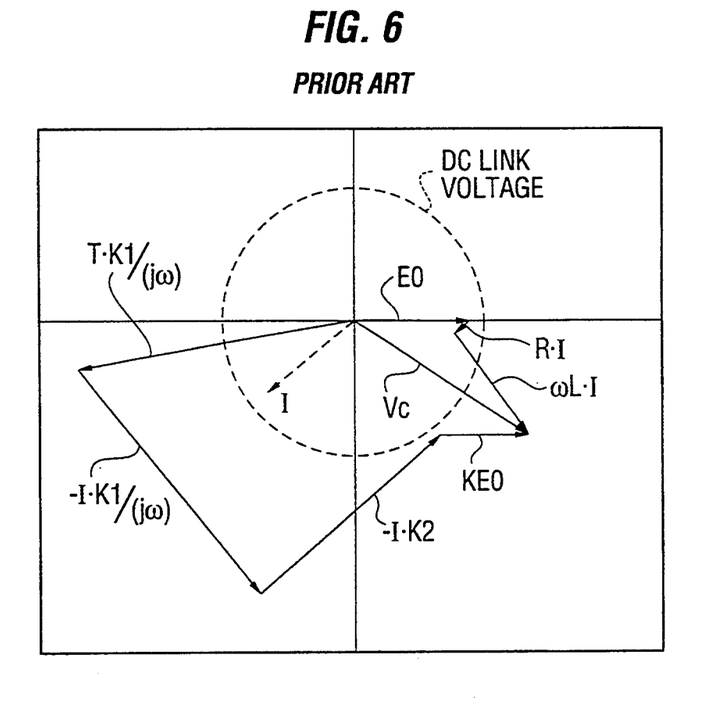
FIG. 6 is a vector diagram in the case where the phase advancing correction of the current command in decelerating is equal to that in decelerating.

FIGS. 5 and 6 are vector diagrams in the case where the motor is decelerated at a velocity of 2000 rpm. FIG. 5 shows a vector diagram in the case where the phase advancing compensation amount $\delta$ is set to "0" (zero). FIG. 6 shows a vector diagram where the phase advancing compensation amount $\delta$ is set to 99.7 degrees. As is obvious from the comparison between FIGS. 5 and 6, when the phase advancing control is executed, the command voltage Vc becomes higher than the DC link voltage which is a power-source voltage of the inverter for controlling the motor. This means that a voltage cannot be applied up to the command voltage Vc. In other words, if the phase advancing correction is equal to that in the case of the acceleration, the phase correction becomes excessive.

SUMMARY OF THE INVENTION

The present invention provides a motor control method by the optimum phase advancing control both in accelerating and in decelerating.

The method according to the present invention comprises a step of determining whether a motor is to be accelerated or decelerated on the basis of the relationship between the motor's actual revolutionary speed and a current command, and a step of advancing a phase of the aforesaid current command only by the amount of phase of advancing correction. If the motor is determined to be decelerated, the aforesaid amount of compensation is set to a value smaller than the amount of compensation in accelerating. The aforesaid amount of phase advancing compensation is calculated by a linear, equation proportional to the motor's revolutionary speed. When the motor is being decelerated, a proportional constant of the above linear equation is set to a constant smaller than that in the case of accelerating.

By setting the amount of phase advancing compensation during the deceleration of the motor to an amount smaller than that during the acceleration, the command voltage Vc applied to the motor is within the aforesaid DC link voltage even during deceleration, so that not only the power factor is improved but also an adequate output torque is obtained in the motor.

DESCRIPTION OF THE PREFERRED EMBODIMENTS

In the preferred embodiment, a phase advancing compensation amount $\delta$ is calculated as a linear function of a motor speed v on the basis of the following equation (1).

$$\delta = K \times |v| \qquad (1)$$

When the proportional constant of the above linear equation (1) is given as k in the case of acceleration, the phase advancing compensation amount d is calculated by the following equation (7):

$$\delta = k \times |v| \qquad (7)$$

In the case of deceleration of the motor, the proportional constant K is given as k' to calculate the amount of phase advancing compensation amount $\delta$ by the following equation (8), where k' < k, more specifically, the value of k' is preferably set to about ⅓ of k.

$$\delta = k' \times |v| \qquad (8)$$

Figure 2:
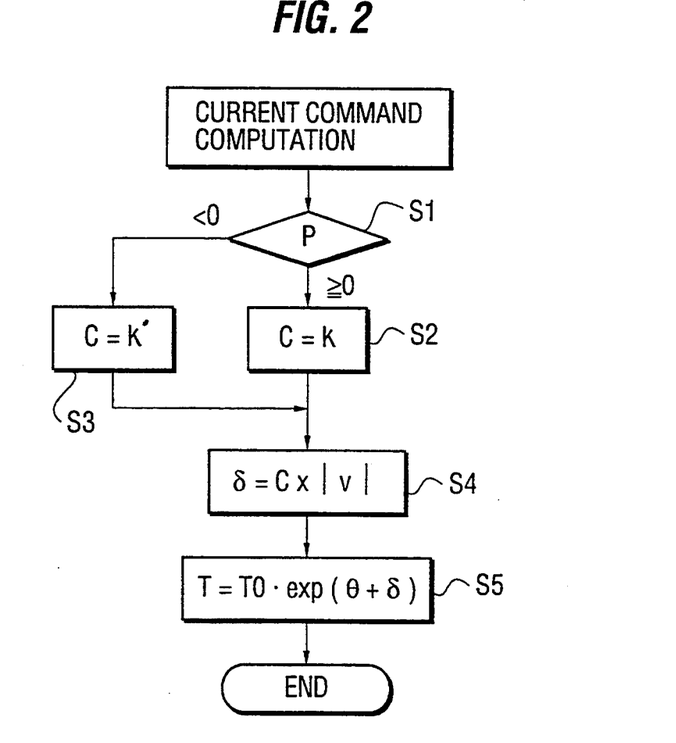
FIG. 2 is a flowchart of current command computing processing carried out by a processor of a motor controller in one embodiment according to the present invention.

FIG. 2 is a flowchart of a current command computing section according to the preferred embodiment of the present invention in the current control processing which is executed in every predetermined period (current loop processing period) by the processor of the motor controller.

First, in step S1, a value P is determined by multiplying the motor speed V (including a plus or minus sign indicative of normal or reverse rotation) read from an encoder or the like mounted on the motor by the current command Tcmd (including a plus or minus sign indicative of normal or reverse rotation command) as P = V × Tcmd, and whether the motor is to be accelerated or decelerated is determined depending on whether the value P is positive or negative. When the value P is positive or, zero (0), the motor is considered to be accelerated, and the processing proceeds to step S2, in which the proportional constant K in the linear equation (1) for calculating the phase advancing amount $\delta$ is set to k' and stored in register C. However, when the value P is less than zero (0), the motor is considered to be decelerated, and the processing proceeds to step S3, in which the proportional constant K in the linear equation (1) for calculating the phase advancing amount $\delta$ is set to k' and stored in the register C. Next, in step S4, the proportional constant k or k' stored in the register C is multiplied by the detected absolute value of the motor's revolutionary speed v to calculated the phase advancing correction amount $\delta$. Subsequently, in step S5, the calculated phase advancing compensation amount $\delta$ is added to a phase $\theta$ corresponding to a rotor position, and a compensated current command (torque command) T is determined by advancing the phase of the current command Tcmd (=To) of each phase. The current loop processing is executed on the basis of the corrected current command T to determine a voltage command to be supplied to the motor, whereby the motor is driven according to a PWM control or the like.

Figure 7:
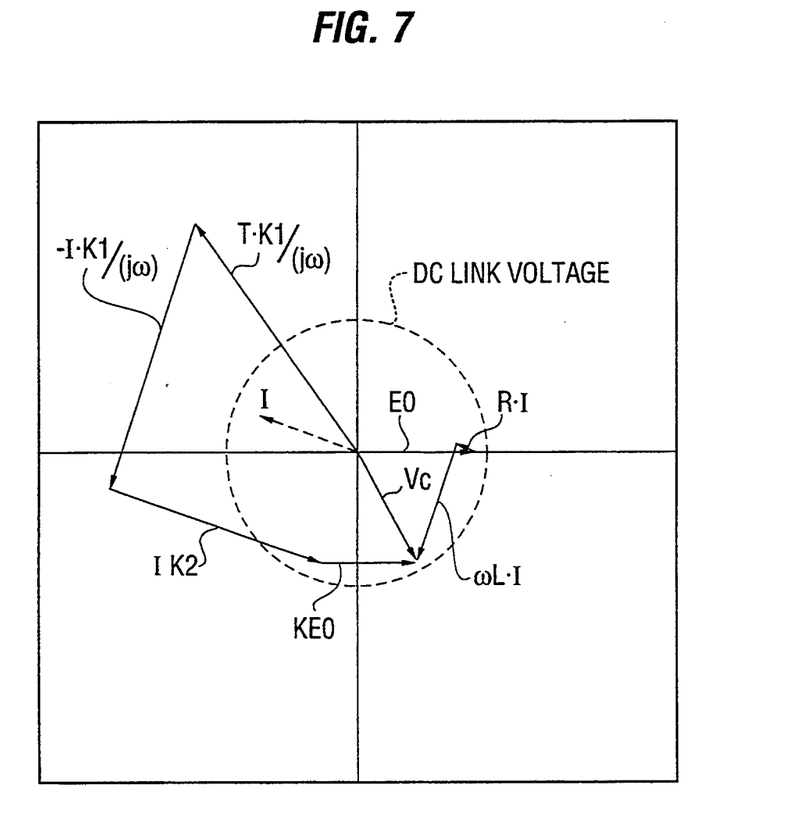
FIG. 7 is a vector diagram in the case where the phase advancing correction in decelerating is set to about ⅓ of that in accelerating.

FIG. 7 is a vector diagram showing the relationship between command side and coil side in the case where the phase advancing compensation amount $\delta$ of the current command in decelerating is set to about ⅓ of that in the case of accelerating under the same condition as stated in FIGS. 3 through 6. In other words, FIG. 7 shows. a vector diagram in the case where the motor is decelerated while being operated at a revolutionary speed of 2000 rpm, and the phase advancing compensation amount $\delta$ is set to an angle of 37 degrees. As seen from the comparison between FIGS. 7 and 6, the power factor is also improved, and the command voltage Vc is within the DC link voltage, which is a power-source voltage of the inverter, thereby indicating that an adequate motor output torque can be obtained.

Figure 8:
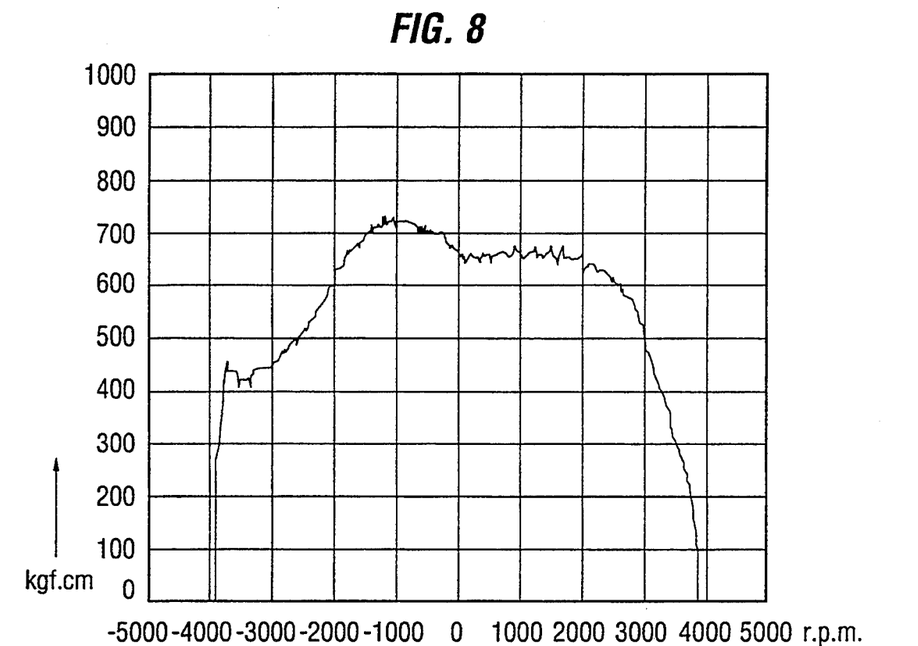
FIG. 8 is a diagram showing the relationship between the motor's revolutionary speed and the motor output torque in the case where the phase advancing compensation of the current command is made in accelerating, and is not made in decelerating.
Figure 9:
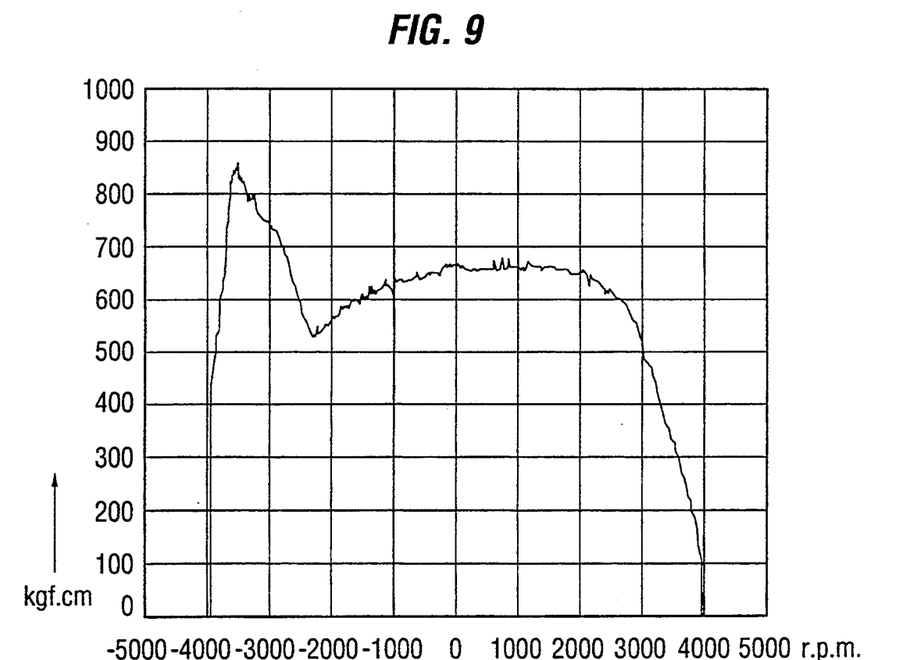
FIG. 9 is a diagram showing the relationship between the motor's revolutionary speed and the motor output torque in the case where the same phase advancing compensation is made in both accelerating and in decelerating.
Figure 10:
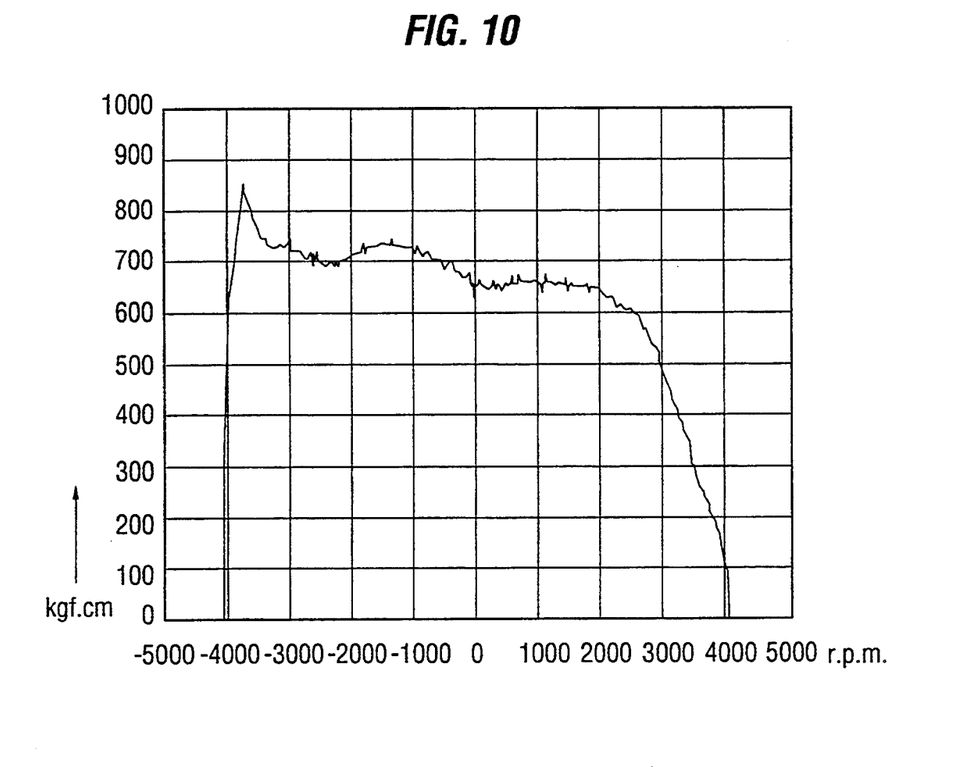
FIG. 10 is a diagram showing the relationship between the motor's revolutionary speed and the motor output torque in the case where the phase advancing compensation in decelerating is controlled to about ¼ of that in accelerating.

FIGS. 8 through 10 are the diagrams showing the relationship between motor's revolutionary speed and the motor's output torque measured in order to determine the advantages of the present invention over the prior art.

FIG. 8 shows the measured result of the above relationship in the case where the motor is controlled by the phase advancing compensation of current command only when accelerating the motor, and FIG. 9 shows the measured result in the case where the motor is controlled by the phase advancing compensation, in which the amount of compensation δ is calculated as d=K×|v| using the same proportional constant K during both the acceleration and deceleration.

FIG. 10 shows the measured result according to the embodiment of the present invention in the case where the aforesaid proportional constant k' in decelerating is set to ¼ of the proportional constant k used in the case of acceleration (k'=k/4). FIGS. 8 through 10 show the results of experiments conducted under the condition that a rotationary speed of the motor is gradually decelerated from a revolutionary speed of −4000 rpm to "0" (zero) and then gradually accelerated up to +4000 rpm.

As seen from FIG. 8, in the case where the phase advancing compensation is not applied in decelerating, when the motor is decelerated during a high-speed revolution, the motor output torque falls.

As seen from FIG. 9, in the case where the phase advancing compensation is made in decelerating by the same amount as in accelerating, the phase will be advanced excessively, and the motor's output torque falls temporarily.

As seen from the measured result shown in FIG. 10, according to the embodiment of the present invention, a sufficient output torque can be obtained from the motor even, during the decelerating.

We claim:

1. A method of controlling an AC synchronous motor by executing current loop processing on the basis of a current command, comprising the steps of:

(a) determining a relationship between an actual revolutionary speed of the motor and a current command;
    (b) determining whether the motor is one of decelerated and accelerated based on the relationship between the actual revolutionary speed of the motor and the current command;
    (c) advancing a phase of the current command by a phase advancing compensation amount according to the determination in step (b), wherein advancing the phase of the current command comprises,
        (c1) setting the compensation amount to a first value when the motor is determined to be accelerating in step (b); and
        (c2) setting the compensation amount to a second value smaller than the first value when the motor is determined to be decelerating in step (b).

2. A method according to claim 1, wherein said advancing step (c) further comprises:

(c3) determining a phase advancing compensation amount by a linear equation proportional to a revolutionary speed of the motor, and
    (c4) setting a proportional constant of said linear equation in decelerating to a value smaller than that in accelerating.

3. A method according to claim 2, wherein said proportional constant of said linear equation in decelerating is set to a value ranging within approximately ¼ through approximately ⅓ of a proportional constant in accelerating.

* * * * *

UNITED STATES PATENT AND TRADEMARK OFFICE
CERTIFICATE OF CORRECTION

PATENT NO. : 5,436,544
DATED : July 25, 1995
INVENTOR(S) : Shunsuke MATSUBARA et al.

It is certified that error appears in the above-indentified patent and that said Letters Patent is hereby corrected as shown below:

TITLE PAGE

Column 1, [56] References Cited, line 1, delete "3,734,633" and insert

—4,734,633—.

Column 2, after line 6, insert

—FOREIGN PATENT DOCUMENTS

| | | |
|---|---|---|
| 4-340389 | 11/1992 | JAPAN |
| 62-207190 | 9/1987 | JAPAN |
| 63-305794 | 12/1988 | JAPAN |
| 3-265485 | 11/1991 | JAPAN—. |

Signed and Sealed this

Twenty-fourth Day of October, 1995

Attest:

BRUCE LEHMAN

Attesting Officer    Commissioner of Patents and Trademarks